US008335682B2

(12) United States Patent
Zou

(10) Patent No.: US 8,335,682 B2
(45) Date of Patent: Dec. 18, 2012

(54) MULTI-LANGUAGE INTERFACES SWITCH SYSTEM AND METHOD THEREFOR

(75) Inventor: Yu Zou, Jiangsu (CN)

(73) Assignee: Sercomm Corporation, Taipei (TW)

( * ) Notice: Subject to any disclaimer, the term of this patent is extended or adjusted under 35 U.S.C. 154(b) by 1120 days.

(21) Appl. No.: 11/976,942

(22) Filed: Oct. 30, 2007

(65) Prior Publication Data

US 2009/0112574 A1 Apr. 30, 2009

(51) Int. Cl.
*G06F 17/20* (2006.01)
(52) U.S. Cl. ............... 704/8; 345/9; 370/389; 370/392; 379/88.06; 455/558; 704/1; 704/2; 704/235; 704/270.1; 704/4; 704/9; 705/51; 709/202; 709/246; 709/250; 715/703; 717/100; 717/104; 717/127; 717/136; 717/174
(58) Field of Classification Search .................. 717/127, 717/100, 104, 136, 174; 704/8, 127, 1, 2, 704/235, 270.1, 4, 9; 707/999.107; 345/9; 370/389, 392; 379/88.06; 455/558; 705/51; 709/202, 246, 250; 715/703
See application file for complete search history.

(56) References Cited

U.S. PATENT DOCUMENTS

| | | | |
|---|---|---|---|
| 6,292,772 B1 * | 9/2001 | Kantrowitz | 704/9 |
| 6,789,127 B1 * | 9/2004 | Chandra et al. | 709/246 |
| 6,803,887 B1 * | 10/2004 | Lauper et al. | 345/9 |
| 6,961,932 B2 * | 11/2005 | Mishra et al. | 717/136 |
| 7,024,365 B1 * | 4/2006 | Koff et al. | 704/270.1 |
| 2001/0013051 A1 * | 8/2001 | Nakada et al. | 709/202 |
| 2002/0038386 A1 * | 3/2002 | Bhatia et al. | 709/250 |
| 2002/0107684 A1 * | 8/2002 | Gao | 704/4 |
| 2002/0181669 A1 * | 12/2002 | Takatori et al. | 379/88.06 |
| 2003/0210694 A1 * | 11/2003 | Jayaraman et al. | 370/392 |
| 2004/0267527 A1 * | 12/2004 | Creamer et al. | 704/235 |
| 2005/0060138 A1 * | 3/2005 | Wang et al. | 704/1 |
| 2005/0132356 A1 * | 6/2005 | Cross et al. | 717/174 |
| 2005/0190761 A1 * | 9/2005 | Nakada et al. | 370/389 |
| 2006/0079281 A1 * | 4/2006 | Ravindra et al. | 455/558 |
| 2006/0116864 A1 * | 6/2006 | McHugh et al. | 704/2 |
| 2006/0230070 A1 * | 10/2006 | Colton et al. | 707/104.1 |
| 2006/0242202 A1 * | 10/2006 | Li | 707/104.1 |
| 2006/0294463 A1 * | 12/2006 | Chu et al. | 715/703 |
| 2007/0016892 A1 * | 1/2007 | Cao | 717/127 |
| 2007/0083471 A1 * | 4/2007 | Robbin et al. | 705/51 |
| 2007/0261017 A1 * | 11/2007 | Sanghvi et al. | 717/100 |
| 2008/0127045 A1 * | 5/2008 | Pratt et al. | 717/104 |

OTHER PUBLICATIONS http://www.java2html.de/, Markus Gebhard, Java2html, 2000, Description, download, and Online Converter.*
Extended European search report of corresponding EU application; mailed on Jan. 14, 2008.
"Creating Multilingual Websites" (Online); Colin E.; Nov. 4, 2004, pp. 1-9, XP002463184; http://www.jugglingdb.com/compendium/geek/multilingualwebsites.html.

* cited by examiner

*Primary Examiner* — Michael Colucci
(74) *Attorney, Agent, or Firm* — Wang Law Firm, Inc.; Li K. Wang; Stephen Hsu

(57) ABSTRACT

A multi-language interfaces system includes a storage unit, a processing unit, and a language switch unit; the storage unit stores an executable code containing a variable code and multiple language packs; the processing unit is electrically connected for transmission to the storage unit to execute the executable codes; and the language switch unit is respectively electrically connected for transmission to the storage unit and the processing unit to provide a signal to the processing unit where the variable code is converted into one of those language packs.

12 Claims, 3 Drawing Sheets

MULTI-LANGUAGE INTERFACES SWITCH SYSTEM AND METHOD THEREFOR

BACKGROUND OF THE INVENTION (a) Field of the Invention

The present invention is related to a multi-language interfaces switch system and method thereof, and more particularly, to a multi-language interfaces switch system generated by replacing a text data with a language pack in software that allows switch among multi-language interfaces.

(b) Description of the Prior Art

Multiple languages are frequently provided on a user interface in electronic equipment or information system to facilitate switching to a language desired at any time by a user.

A method used in a system of the prior art that allows switch among multi-language interfaces involves having many translated source codes of a web page directly translated into multiple different language packs and providing a language switch unit on a user interface for the user to switch to a desired language at any time. The method however consumes enormous memory capacity by source codes of the web page, and further consumed memory capacity grows by fold when those source codes are translated into multiple languages. Consequently, not only the speed of the system to execute is slowed down but also the translation into language becomes difficult since the quantity of the language pack is limited due to the space available in the memory built in electronic equipment.

Another method of the prior art to switch among multi-language interfaces involves retrieving the characters mapping an indexed sequential document from a specified text base according to a language selected by a user so to display text of the language system in that document, and a new interface language can be added at any time without revising user interface. However, in this method translation of interface language is done using an encoding and decoding process and requiring multiple text bases. This conventional method results in complicated encoding and decoding processes and excessively massive data load.

In view of the shortcomings of the prior art, the inventor of the present invention based on years of experience in the antenna field to conduct experiments and modifications, and finally developed a multi-language interfaces switch system and its method to overcome the foregoing shortcomings.

SUMMARY OF THE INVENTION

The primary purpose of the present invention is to provide a multi-language interfaces switch system and method thereof. Wherein, a language pack is used to substitute for a text data in software for creating the system that permits switch among multiple language interfaces to satisfy user's demands of a multi-language interfaces switch system and a method thereof while correcting defectives found with the prior art for a memory in the system to accommodate more language packs, easy switching among multi-language interfaces, and facilitating translation.

To achieve the purpose, a multi-language interfaces system of the present invention includes a storage unit, a processing unit, and a language switch unit. Wherein, the storage unit stores multiple language packs and an executable code containing a variable code; the processing unit is electrically connected to the storage unit for executing the executable codes; and the language switch unit is respectively electrically connected to the storage unit and the processing unit for providing a signal to the processing unit where the variable code is converted into one of those language packs.

Accordingly, the present invention discloses a multi-language interfaces switch method that includes the following steps:

(a) A storage unit stored with an executable code containing a variable code and multiple language packs is prepared;

(b) The executable code is then executed by a processing unit; and (c) A signal is provided through a language switch unit to the processing unit where the variable code is converted into one of those language packs.

To make it easier for our examiner to understand the objective of the invention, its structure, innovative features, and performance, we use preferred embodiments together with the attached drawings for the detailed description of the invention.

DETAILED DESCRIPTION OF THE PREFERRED EMBODIMENTS

Figure 1:
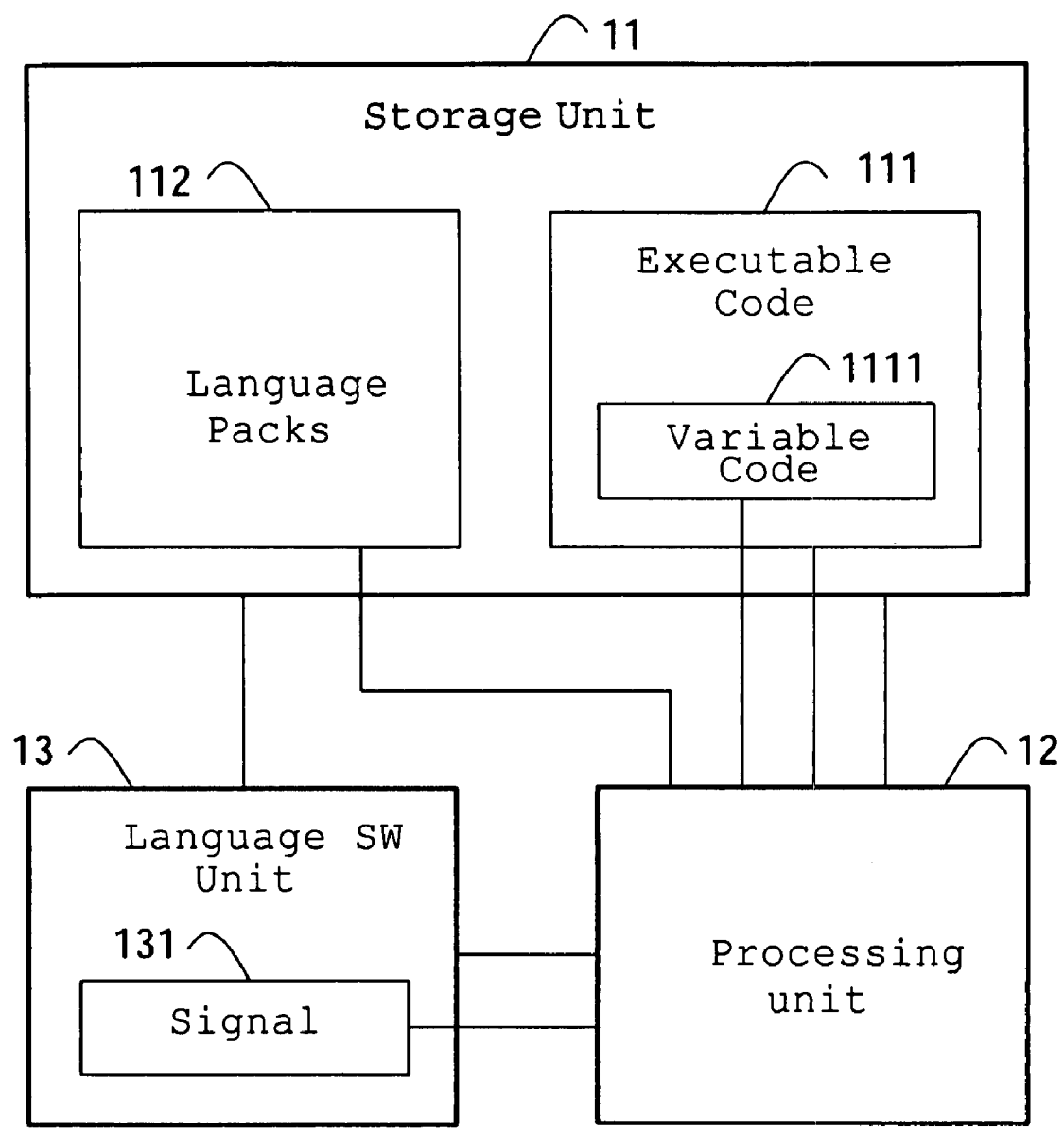
FIG. 1 is a schematic view showing a multi-language interfaces switch system of the present invention.

Referring to FIG. 1, a multi-language interfaces switch system 1 is comprised of a storage unit 11, a processing unit 12, and a language switch unit 13. Wherein, the storage unit 11 is generally related to a flash, a disk unit, and any type of storage medium and stores an executable code 111 containing a variable code 1111 and multiple language packs 112. The variable code 1111 is provided to substitute for a text data in the executable code 111 and the text data are stored in those language packs 112. The executable code 111 is generally related to HyperText Markup Language (HTML), JavaScript, Common Gateway Interface (CGI), and any combination of these program codes. Multiple messages generated by JavaScript are corresponding to multiple check keys on one-to-one basis for checking whether those messages are correct. The processing unit 12 is electrically connected to the storage unit 11 for executing the executable code. The language switch unit 13 is electrically connected to the storage unit 11 and the processing unit respectively for providing a signal 131 to the processing unit 12, where the variable code 1111 is converted into one of those language packs 112. The language switch unit 13 generally includes a language menu for generating the signal 131. The multi-language interfaces switch system 1 usually contains a user interface electrically connected to the storage unit 11, the processing unit 12, and the language switch unit 13 respectively for providing a user to execute the interface.

Figure 2:
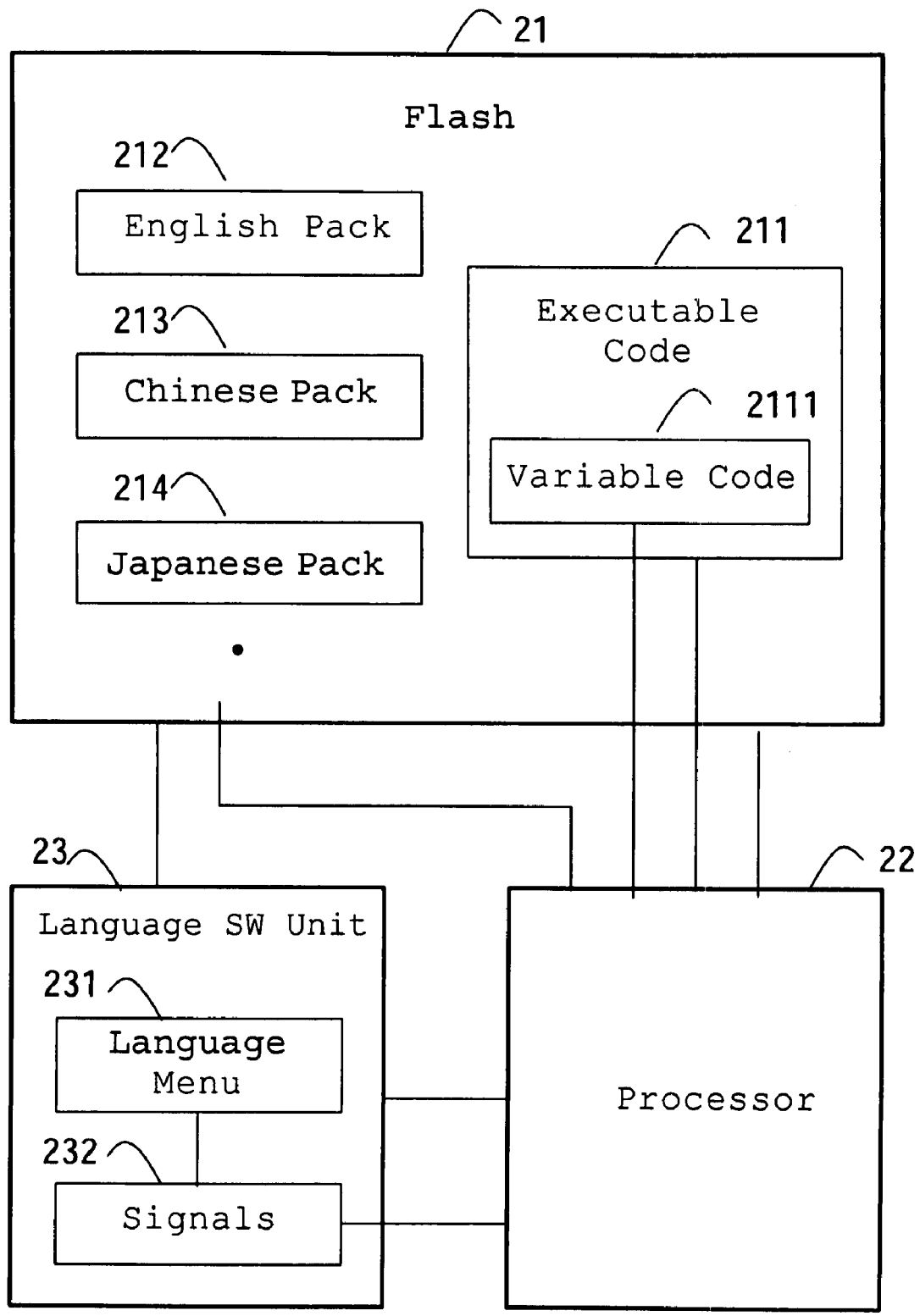
FIG. 2 is a schematic view showing a preferred embodiment of the present invention.

Now referring to FIG. 2 for a multi-language interface switch system 2 of a preferred embodiment in accordance with the present invention, a flash 21 is prepared to storage an executable code 211 containing a variable code 2111 and multiple language packs, e.g., a Chinese pack 213, an English pack 212, a Japanese pack 214, etc. The variable code 2111 substitutes for a text data in the executable code 211, and the text data are stored in those language packs. A processor 22 is electrically connected to the flash 21 for executing the executable code 211. A language switch unit 23 is electrically connected to the flash 21 and the processor 22 respectively for providing a language menu 231 for a user to select one language pack (e.g., the English pack 212) thus to further generate a signal 232 to the processor 22, where the variable code 2111 is converted into the English pack 212. The multi-language interfaces switch system 2 usually further includes a user interface electrically connected to the flash 21, the processor 22, and the language switch unit 23 respectively for providing the interface to a user.

It is noted that how to use the variable code 2111 to substitute for a text data in the executable code 211 and produce the text data into those language packs are done as follows:

(1) The text data displayed by the HTML program code: a syntax of HTML is generally described as: <td width="164" height="24" colspan="2" class="bwhead">Access restriction</td > is modified in the present invention to read as: <td width="164" height="24" colspan="2" class="bwhead"><script language="javascript" type="text/javascript">document.write(va_access);</script></td>; that is, a variable code "document.write(va_access)" substitute for a text data "Access restriction" and is defined for JavaScript to perform readout and procedural output. A JavaScript associated document file, e.g., lang_en.js, is added into one of those language packs (e.g., the English pack 212), and another variable code "var va_access="Access restriction" is defined in the document file. Upon operating HTML, JavaScript takes the place to perform readout and procedural output according to an access route of the document file.

(2) Text data displayed by the program code of JavaScript: no modification other than the access route is required for the text data here since they have been written with variable code originally. It merely stores the text data in a JavaScript associated document file of one of those language packs (e.g., the English pack 212). A tool is applied to convert the JavaScript document file into a HTML document file, e.g., a message.js file. In the course of operation of JavaScript, its readout and procedural output is done according to an access route of the document file. Whereas the text data in a HTML file is related to multiple messages displayed in multiple pop-up message boxes and a translator usually does not know which message will appear under which situation from those pop-up message boxes, the system of the present invention provides multiple check keys corresponding to those messages on one-to-one basis for the translator to check whether these messages are correct while performing the translation.

(3) Text data displayed by the CGI program code: the text data is first stored in a CGI associated document file (e.g., err_msg file or cgi_lang file) of one of those language packs (e.g., the English pack 212, and set up a variable code in the document file, e.g., "0=Enable, 1=enable, =Disable, and 3=disable". In the course of operating the CGI, data are read out via an access route of the document file and various text data are dynamically outputted depending on an operating status of equipment.

According, text data contained in the executable code 211 includes text data displayed by different program codes HTML, JavaScript, and CGI are substituted by the variable code 2111. Text data displayed by different program codes are respectively stored in individual document files of one of those language packs (e.g., the English pack 212), e.g., lang_en.js file, message.js file, err_msg file, or cgi_lang file. The translator simply translates each document file in the English pack 212 into other version of language, e.g., into Chinese or Japanese to generate the Chinese pack 213 or the Japanese pack 214.

Figure 3:
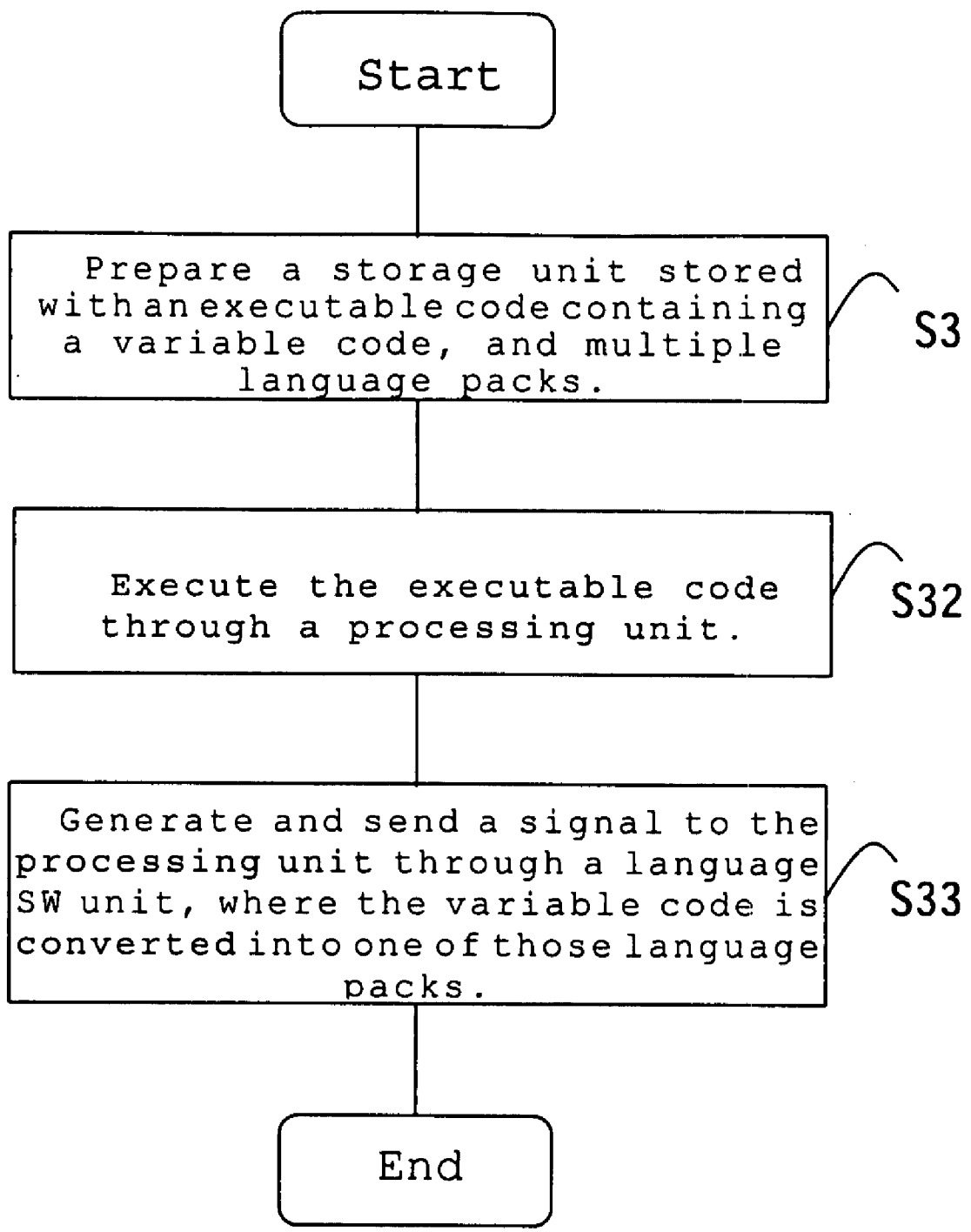
FIG. 3 is a flow path showing a method of the present invention.

FIG. 3 shows a flow path of a multi-language interfaces switch method corresponding to the multi-language interfaces switch system illustrated in FIG. 1 and is essentially comprised of the following steps:

S31: A storage unit 11 stored with an executable code 111 containing a variable code 111 and multiple language packs 112 is prepared; the Storage unit 11 is related to a flash, a disk, or any type of storage medium; the variable code 111 substitutes a text data contained in the executable code 111, and the text data is stored in those language packs 112; the executable code 111 usually contains a HTML program code, a JavaScript program code, a CGI program code, and any combination of these program codes; and multiple messages generated by the JavaScript program code correspond to multiple check keys on one-to-one basis to check if those messages are correct.

S32: A processing unit 12 executes the executable code 111.

S33: A signal 131 is generated from a language switch unit 13 and sent to the processing unit 12, where the variable code 1111 is converted into one of those language packs 112; and the language switch unit 13 further contains a language menu to generate the signal 131.

It is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

What is claimed is:

1. A multi-language interfaces switch system, comprising:
a storage medium storing an executable code that contains a variable code, and multiple language packs, wherein text data are contained in the multiple language packs instead of the executable code;
a processor electrically connected to the storage medium for executing the executable code; and
a language switch unit, electrically connected to the storage medium and the processor, for generating and sending a signal to the processor, the processor converts the variable code into one of the language packs and the language switch unit includes a language menu for switching among multi-language interfaces,
wherein the executable code comprises a JavaScript program code generating a plurality of pop-up message boxes, and a tool is further applied to convert the JavaScript program code into a HTML document file, in which a plurality of check keys are provided on a one-to-one basis corresponding to the pop-up message boxes, each of the check keys triggers a corresponding one of the pop-up message boxes to display a corresponding message for being checked by a translator.

2. The system as claimed in claim 1, further comprising a user interface, wherein the user interface is connected to the storage medium, the processor, and the language switch unit respectively for a user to execute the user interface.

3. The system as claimed in claim 1, wherein the storage medium being a flash or a disk unit.

4. The system as claimed in claim 1, wherein the variable code is substituted by text data stored in the language pack corresponding to the signal.

5. The system as claimed in claim 1, wherein the executable code contains a HyperText Markup Language (HTML) program code, a Common Gateway Interface (CGI) program or combinations thereof.

6. The system as claimed in claim 1, wherein the language switch unit further contains a language menu to generate the signal.

7. A method for switching multi-language interfaces, comprising steps of:

preparing a storage medium stored with an executable code containing a variable code, and multiple language packs, wherein text data are contained in the multiple language packs instead of the executable code;

having a processor to execute the executable code;

generating and sending a signal via a language switch unit to the processor, wherein the language switch unit includes a language menu for switching among multi-language interfaces; and converting the variable code into one of those language packs by the processor, wherein the executable code comprises a JavaScript program code generating a plurality of pop-up message boxes, and a tool is further applied to convert the JavaScript program code into a HTML document file, in which a plurality of check keys are provided on a one-to-one basis corresponding to the pop-up message boxes, each of the check keys triggers a corresponding one of the pop-up message boxes to display a corresponding message for being checked by a translator.

8. The method as claimed in claim 7, further comprising a step of providing a user interface, wherein the user interface is electrically connected to the storage medium, the processor, and the language switch unit respectively for providing a user to execute the user interface.

9. The method as claimed in claim 7, wherein the storage medium contains a flash or a disk unit.

10. The method as claimed in claim 7, wherein the variable code is substituted by text data stored in the language pack corresponding to the signal.

11. The method as claimed in claim 7, wherein the executable code contains a HyperText Markup Language (HTML) program code, a Common Gateway Interface (CGI) program or combinations thereof.

12. The method as claimed in claim 7, wherein the language switch unit further includes a language menu to generate the signal.

* * * * *